United States Patent [19]

Simpson

[11] Patent Number: 5,305,541
[45] Date of Patent: Apr. 26, 1994

[54] GAME SCENT DISPENSING APPARATUS

[76] Inventor: Tony R. Simpson, Rte. 3, Box 92, Elkin, N.C. 28621

[21] Appl. No.: 973,643

[22] Filed: Nov. 9, 1992

[51] Int. Cl.⁵ .......................... A01M 1/20; B67D 5/64
[52] U.S. Cl. ........................................... 43/1; 43/129
[58] Field of Search .............................. 43/1, 126, 129

[56] References Cited

U.S. PATENT DOCUMENTS

| | | | |
|---|---|---|---|
| 2,662,332 | 12/1953 | McIntire | 43/129 |
| 2,816,394 | 12/1957 | Loibl | 43/129 |
| 3,694,146 | 9/1972 | Roy | 43/129 |
| 4,228,124 | 10/1980 | Kashihara | 43/129 |
| 4,860,488 | 8/1989 | Shigetoyo | 43/129 |
| 4,953,763 | 9/1990 | Kierum | 43/1 |

Primary Examiner—Kurt C. Rowan
Attorney, Agent, or Firm—Leon Gilden

[57] ABSTRACT

A dispensing apparatus includes a container having a plurality of partition walls, with a first and fourth partition wall positioned adjacent respective first and second end walls of the housing, with the first partition wall and the second end wall having plug members mounted to link structure to effect opening of the first partition wall and the second end wall to air flow, with conduit structure directing air flow therethrough adjacent the second end wall through a scent dispensing canister that in turn directs the thusly scented air through the first end wall by means of a blower motor directing air through the conduit structure and scent dispensing container. Remote control structure, or alternatively manual structure, may be employed to effect separation of the plug members relative to the first partition wall and the second end wall.

6 Claims, 4 Drawing Sheets

GAME SCENT DISPENSING APPARATUS

BACKGROUND OF THE INVENTION

1. Field of the Invention

The field of invention relates to game scent dispensing structure, and more particularly pertains to a new and improved game scent dispensing apparatus wherein the same permits the selective metered dispensing of scented air from within an associated dispensing housing.

2. Description of the Prior Art

Scent dispensing structure of various types have been utilized in the prior art and are exemplified by the U.S. Pat. Nos. 4,374,571; 4,735,010; 4,609,127; and 4,953,765.

The instant invention overcomes deficiencies of the prior art by providing for a housing structure arranged for either manual or remote actuation to permit metered air flow therethrough utilizing a blower motor structure.

SUMMARY OF THE INVENTION

In view of the foregoing disadvantages inherent in the known types of scent dispenser structure now present in the prior art, the present invention provides a game scent dispensing apparatus wherein the same utilizes remote control means for effecting selective actuation of a blower motor and scent dispensing organization within an associated housing. As such, the general purpose of the present invention, which will be described subsequently in greater detail, is to provide a new and improved game scent dispensing apparatus which has all the advantages of the prior art scent dispensing structure and none of the disadvantages.

To attain this, the present invention provides a dispensing apparatus including a container having a plurality of partition walls, with a first and fourth partition wall positioned adjacent respective first and second end walls of the housing, with the first partition wall and the second end wall having plug members mounted to link structure to effect opening of the first partition wall and the second end wall to air flow, with conduit structure directing air flow therethrough adjacent the second end wall through a scent dispensing canister that in turn directs the thusly scented air through the first end wall by means of a blower motor directing air through the conduit structure and scent dispensing container. Remote control structure, or alternatively manual structure, may be employed to effect separation of the plug members relative to the first partition wall and the second end wall.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved game scent dispensing apparatus which has all the advantages of the prior art scent dispensing structure and none of the disadvantages.

It is another object of the present invention to provide a new and improved game scent dispensing apparatus which may be easily and efficiently manufactured and marketed.

It is a further object of the present invention to provide a new and improved game scent dispensing apparatus which is of a durable and reliable construction.

An even further object of the present invention is to provide a new and improved game scent dispensing apparatus which is susceptible of a low cost of manufacture with regard to both materials and labor, and which accordingly is then susceptible of low prices of sale to the consuming public, thereby making such game scent dispensing apparatus economically available to the buying public.

Still yet another object of the present invention is to provide a new and improved game scent dispensing apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 2:
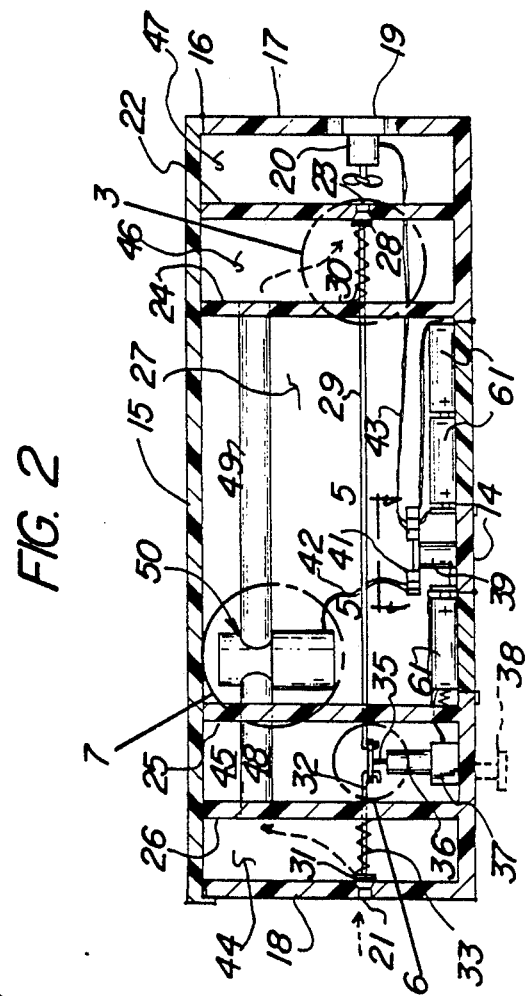
FIG. 2 is an orthographic view, taken along the lines 2—2 of FIG. 1 in the direction indicated by the arrows.
Figure 1:
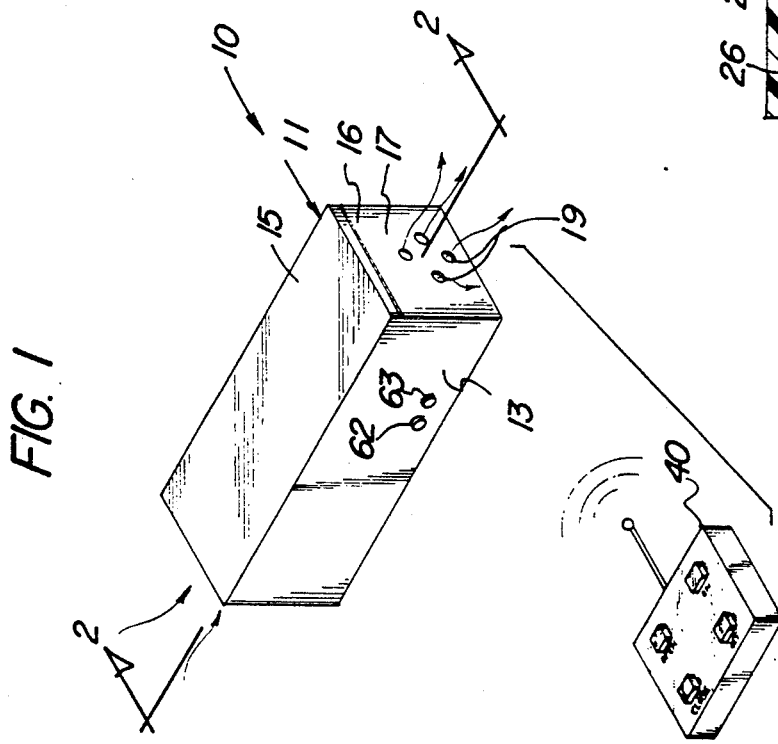
FIG. 1 is an isometric illustration of the invention.
Figure 3:
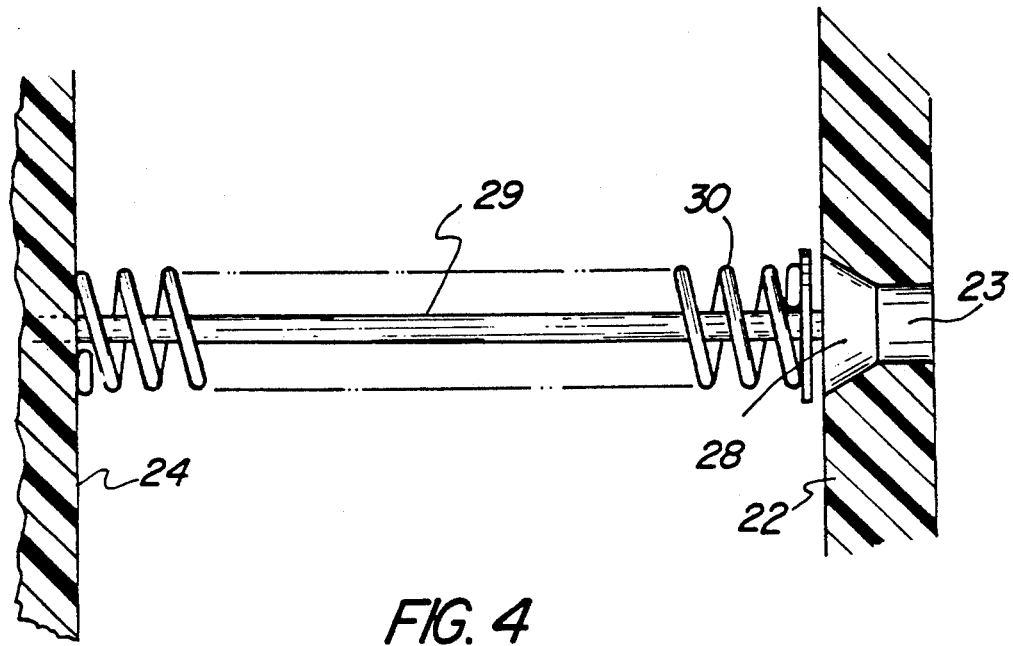
FIG. 3 is an enlarged orthographic view of section 3 as set forth in FIG. 2.
Figure 4:
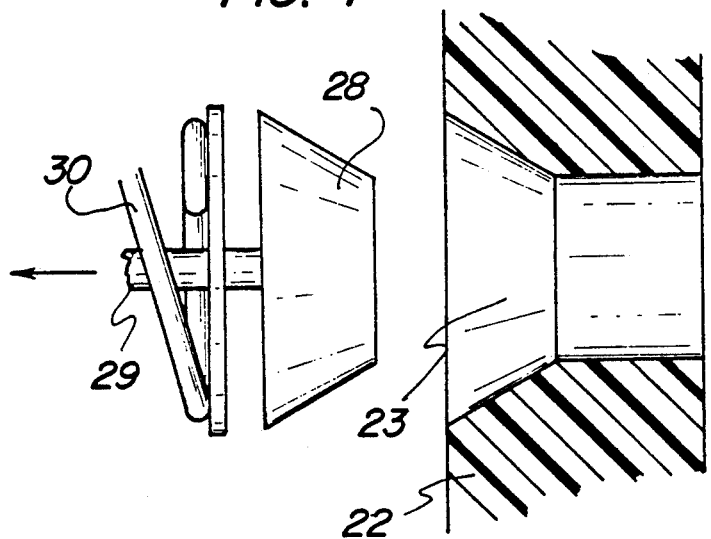
FIG. 4 is an enlarged orthographic view of the first plug member separated from the first partition wall.
Figure 5:
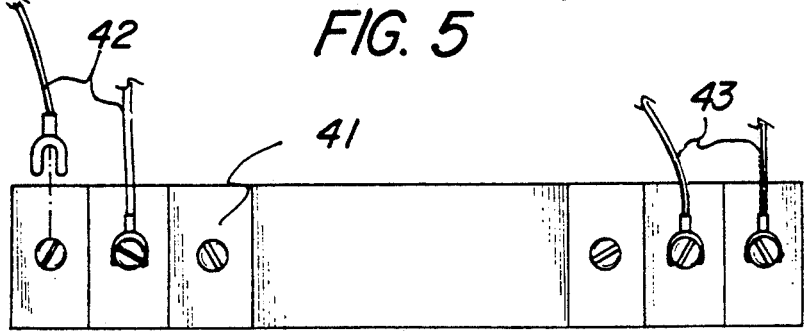
FIG. 5 is an orthographic view, taken along the lines 5—5 of FIG. 2 in the direction indicated by the arrows.
Figure 6:
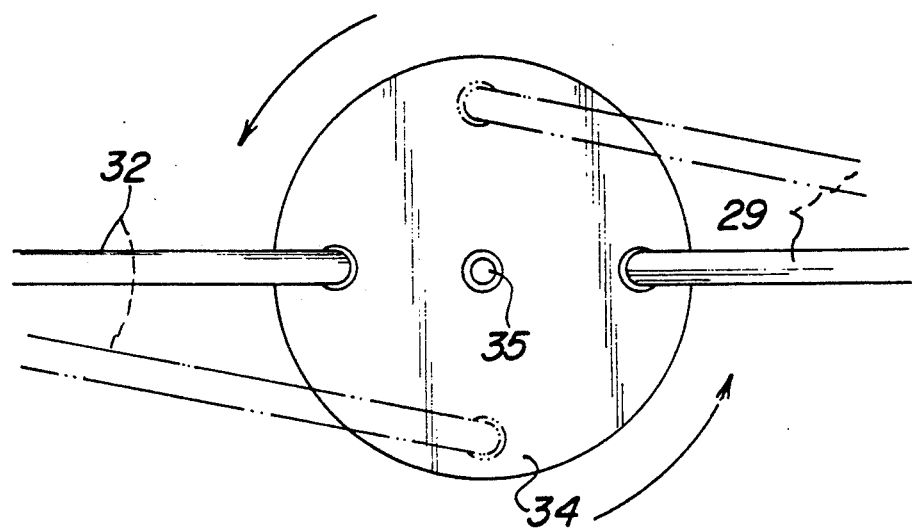
FIG. 6 is a top orthographic view of section 6 as set forth in FIG. 2.
Figure 7:
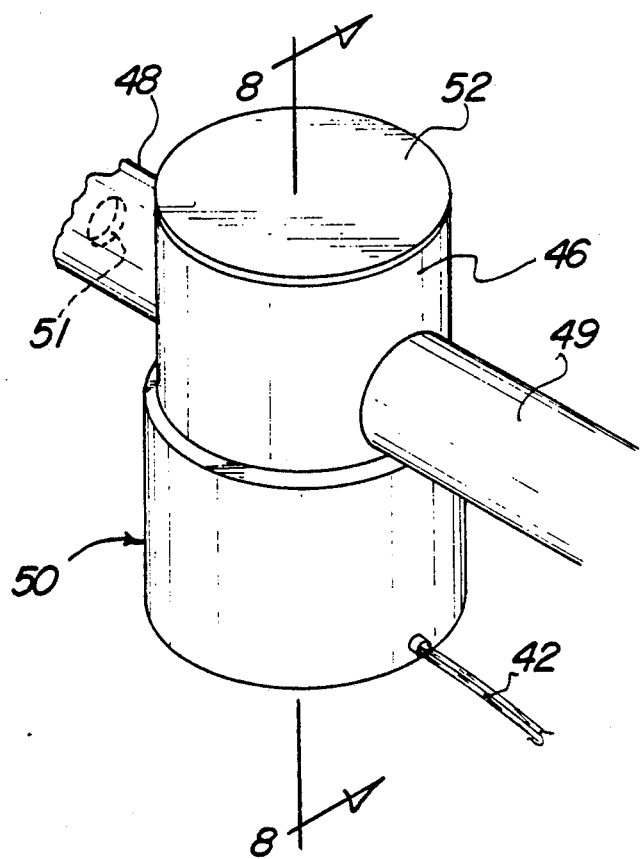
FIG. 7 is an enlarged isometric illustration of section 7 as set forth in FIG. 2.
Figure 8:
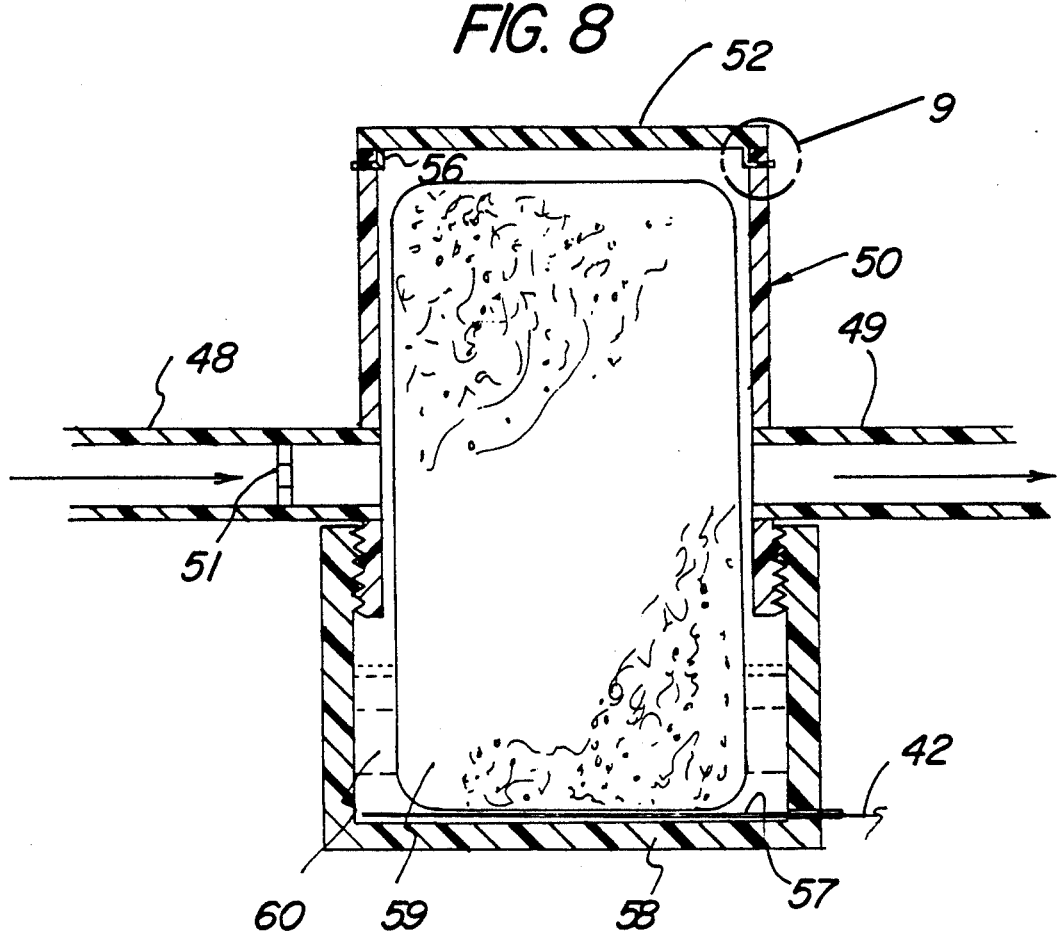
FIG. 8 is an orthographic view, taken along the lines 8—8 of FIG. 7 in the direction indicated by the arrows.

With reference now to the drawings, and in particular to FIGS. 1 to 9 thereof, a new and improved game scent dispensing apparatus embodying the principles and concepts of the present invention and generally designated by the reference numeral 10 will be described.

More specifically, the game scent dispensing apparatus 10 of the instant invention essentially comprises a housing 11 having spaced side walls 13, a floor 14, and a first end wall 17 spaced from a second end wall 18, with a lid 15 having a lid hinge 16 pivotally mounting the lid 15 relative to the first end wall 17 permitting access within the housing 11. A plurality of first end wall openings 19 are directed through the first end wall, with a blower fan 20 mounted within the housing 11 in adjacency to the first end wall 17 to effect directing of pressurized air by the blower fan 20 through the first end wall openings 19. A single second end wall opening 21 is directed through the second end wall 18. A first partition wall 22 is mounted within the housing 11 directed within the housing between the side walls 13, the floor 14, and the lid 15, with the first partition wall 22 having a first partition wall opening 23 coaxially aligned with the second end wall opening 21. A second partition wall 24 is coextensive with the first partition wall 22 and spaced therefrom relative to a third partition wall 25 coextensive with the second partition wall 24. A battery cavity 27 is oriented between the second and third partition walls 24 and 25. A fourth partition wall 26 is oriented between the second partition wall 24 and the second end wall 18. A first plug member 28 is removably mounted relative to the first partition wall opening 23, with the first plug member 28 having a first actuator link 29 fixedly mounted thereto, with a first spring 30 captured between the first plug member 28 and the second partition wall 24. The first actuator link 29 extends through the battery cavity 27 and the third partition wall 25 in a slidable relationship relative to the second and third partition walls, with the first actuator link mounted pivotally to a pivot plate 34. A second plate member 31 received within the second end wall opening 21 is removably mounted thereto, with a second actuator link 32 mounted to the second plug member 31 and subsequently slidably projected through the fourth partition wall 26 and secured diametrically to the first actuator link 29 relative to the pivot plate 34. In this manner (see FIG. 6), pivoting of the pivot plate 34 effects displacement of the first and second actuator links 29 and 32 and simultaneous separation of the first and second plug members 28 and 31 relative to the first partition wall 22 and the second end wall 18. The pivot plate 34 is fixedly mounted to an axle 35 that in turn is coaxially and fixedly mounted to the pivot plate 34 and upon rotation of the axle 35 effects rotation of the pivot plate 34. The axle 35 is directed through a servo motor 36 to effect the rotation of the axle 35 selectively upon a receiver 37 receiving actuation from a transmitter 40 to effect actuation of the servo motor 36 and the subsequent rotation of the pivot plate 34. If desired, a manual shaft 38 is arranged for selective rotation of the axle 35 and alternative to, or in lieu of utilization of the receiver and transmitter 40.

First junction 41 is mounted to the floor 14 of the dispensing housing 11, having (see FIG. 5) heater wires 42 and blower motor wires 43 directed therefrom. The blower motor wires 43 are directed to the blower motor, with the switch junction 41 arranged for selective actuation by the transmitter 40, or alternatively by on/-off button switch members 62, 63 arranged for manual communication of the heater and junction wires 42 and 43, with the battery members 61 that are also to effect powering of the servo motor 36 upon actuation of the servo motor receiver 37 by the transmitter 40.

It should be noted that a first cavity 44 is oriented between the second end wall 18 and the fourth partition wall 26. A second cavity 45 is positioned between the fourth partition wall and the third partition wall, a third cavity 46 oriented between the second partition wall and the first partition wall, and a fourth cavity 47 oriented between the first partition wall and the first end wall 17. A first pneumatic conduit 48 in pneumatic communication with the first cavity 45 is directed through the second cavity into a canister 50 within the battery cavity 27. A second pneumatic conduit 49 is directed from the canister 50 through the battery cavity into pneumatic communication with the third cavity 46. It should be noted therefore that when the blower motor directs pressurized air through the first end wall openings 19, and the first plug member 28 and the second plug member 31 are displaced relative to the respective openings, air is directed by vacuum through the second end wall opening 21, the first pneumatic conduit 48, the canister 50, the second pneumatic conduit 49, into the second cavity 46 and through the first partition wall opening 23 for projection through the first end wall opening 19. A venturi 51 is positioned within the first pneumatic conduit 48 in adjacency to the canister 50 to enhance velocity of air flow directed into the canister 50.

Figure 9:
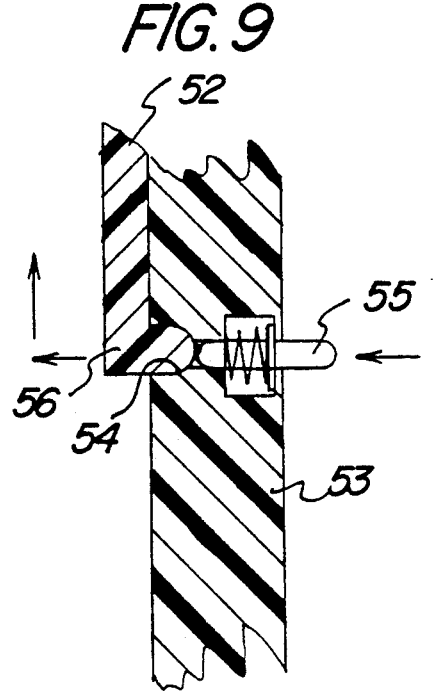
FIG. 9 is an enlarged orthographic view of section 9 as set forth in FIG. 8.

The canister 50 includes a canister lid 52 removably mounted thereto. The canister lid 52 to this end includes (see FIG. 9) an annular skirt, with the annular skirt including a plurality of skirt legs 56, with each skirt leg arranged for reception within a side wall opening 54 of a canister side wall 53. Separation of each skirt leg 56 from the associated side wall opening 54 is effected by a spring-biased plunger 55 mounted within the side wall in alignment with each side wall opening 54 to effect selective displacement of a skirt leg 56 relative to the canister side wall 53, in a manner as indicated in FIG. 9.

The canister 50 includes a canister floor 58, with an electrical resistance heater 57 in electrical communication with the heater wires 42. Further, actuation of the electrical resistance heater 57 is effected upon directing electrical current from the batteries 61 through the switch member 39 by selective use of the on/off switch button 62, 63 or the transmitter 40. A porous sponge core 59 extends coextensively within the canister 50 between the floor and the lid, having a fluid game scent attractant 60 therewithin saturating the sponge, whereupon air directed from the first pneumatic conduit into the second pneumatic conduit 48 and 49 respectively through the canister 50 directs such scent from the first end wall openings 19, in a manner as discussed above.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A game scent dispensing apparatus, comprising,
   a dispensing housing, with the dispensing housing having a housing floor, housing side walls, a first end wall spaced from a second end wall, and a lid having a lid hinge, with the lid hinge secured to the lid and to the first end wall to pivotally mount the lid relative to the dispenser housing, and
   a scent dispensing canister mounted within the housing between the first end wall and the second end wall, and the first end wall having a plurality of first end wall openings, and the second end wall having a single second end wall opening, and a blower fan mounted within the housing in adjacency to the first end wall, and conduit means mounted within the housing in operative communication with the canister for directing air from the second end wall through the canister and the first end wall, and
   the housing includes a first partition wall in adjacency to the first end wall defining a fourth cavity, with a second partition wall spaced from the first partition wall defining a second cavity within the housing, and a third partition wall spaced from the second partition wall defining a battery cavity, and a fourth partition wall spaced from the third partition wall defining a second cavity, and a first cavity defined between the fourth partition wall and the second end wall, and the conduit means including a first pneumatic conduit in pneumatic communication with the first cavity directed through the second cavity into the battery cavity, with the canister mounted within the battery cavity, and the conduit means further including a second partition wall into a third cavity oriented between the second partition wall and the first partition wall, with the first partition wall having a first partition wall opening to permit air flow from the second end wall opening through the first pneumatic conduit into the canister, and from the canister into the second pneumatic conduit, from the second pneumatic conduit into the third cavity, and from the third cavity through the first partition wall opening into the fourth cavity.

2. An apparatus as set forth in claim 1 wherein the canister includes a canister floor, a canister side wall, and a canister lid, with the canister side wall including the first pneumatic conduit and the second pneumatic conduit directed therein, and the first conduit having a venturi within the first conduit in adjacency relative to the canister, and a fluid game scent positioned within the canister, and a porous sponge core positioned within the canister absorbing the fluid game scent directing the game scent through the second pneumatic conduit upon actuation of the blower fan.

3. An apparatus as set forth in claim 2 including a switch member mounted within the battery cavity, and at least one battery mounted within the battery cavity, and blower motor wires directed from the switch member to the blower fan, and the switch member permitting selective actuation of the blower fan.

4. An apparatus as set forth in claim 3 including heater wires directed from the switch member to the canister, and an electrical resistance heater mounted within the canister in electrical communication with the heater wires and the at least one battery for heating of the fluid game scent within the canister to enhance vaporizing the game scent within the canister.

5. An apparatus as set forth in claim 4 including a first plug member mounted removably relative to the first partition wall opening, and a first actuator link mounted to the first plug member, with the first link slidably directed through the second partition wall and the third partition wall, and a first spring captured between the second partition wall and the plug member to bias the plug member into communication with the first partition wall opening, and a pivot plate, with the first actuator link mounted to the pivot plate, and a second actuator link mounted to the pivot plate diametrically opposed relative to the first pivot plate, and the second actuator link including a second plug member, and the second plug member mounted removably relative to the second end wall opening, and a second spring captured between the second plug member and the fourth partition wall, and motor means in operative communication with the at least one battery for effecting selective pivoting of the pivot plate and separation of the first plug member and the second plug member relative to the respective first partition wall opening and the second end wall opening.

6. An apparatus as set forth in claim 5 wherein the canister lid includes a lid skirt, and the lid skirt includes a plurality of lid legs, and the canister side wall includes a plurality of side wall recesses, with each side wall recess receiving one of said lid legs, and the canister side wall having a plurality of spring-biased plungers, with one of the spring-biased plungers mounted in alignment with one of the side wall recesses for effecting selective displacement of one of said lid legs when positioned within one of said recesses.

* * * * *